(No Model.)
J. PORTEOUS.
CULTIVATOR.
No. 461,172.    Patented Oct. 13, 1891.
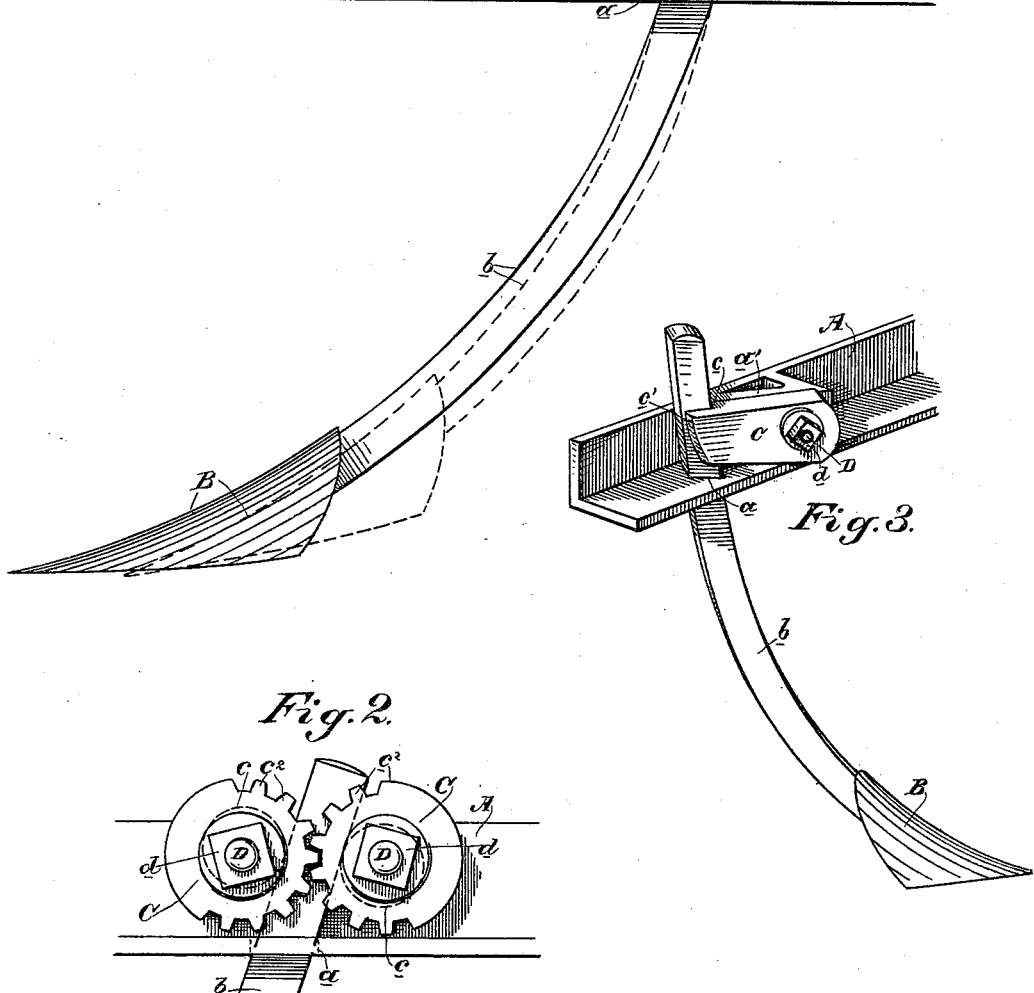
Witnesses,
J. H. Strouse
H. F. Ascheck
Inventor
James Porteous
By Dewey & Co.
Attys

UNITED STATES PATENT OFFICE.

JAMES PORTEOUS, OF FRESNO, CALIFORNIA.

CULTIVATOR.

SPECIFICATION forming part of Letters Patent No. 461,172, dated October 13, 1891.

Application filed March 9, 1891. Serial No. 384,345. (No model.)

*To all whom it may concern:*

Be it known that I, JAMES PORTEOUS, a citizen of the United States, residing at Fresno, Fresno county, State of California, have invented an Improvement in Cultivators; and I hereby declare the following to be a full, clear, and exact description of the same.

My invention relates to the class of cultivators, and especially to the adjustable teeth thereof.

My invention consists in the novel connection for the teeth, the means for holding them and admitting of their adjustment, hereinafter fully described, and specifically pointed out in the claims.

The blades or teeth of cultivators after being in use get dull and become beveled on their under edge to a plane parallel with the horizontal line of the frame to which they are attached. Now if the teeth are so connected with the frame that they can be moved through a slight arc it is obvious that a new line of contact of their beveled under sides with the earth will be presented, and further use will therefore sharpen them, and this will continue until a full fresh bevel is formed, when the teeth will get dull again. Then a second adjustment is required to again place them at such an angle that they will sharpen themselves.

The object of my invention is to connect the teeth with the cultivator-frame in such a manner that this adjustment may be readily effected, and also that an adjustment up and down may be had, according to whether the teeth are working in hard ground or loose or sandy ground.

Referring to the accompanying drawings for a more complete explanation of my invention, Figure 1 is a side elevation of a cultivator-tooth and its connection with the bar. Fig. 2 is a view showing a double clamp. Fig. 3 is a perspective view showing an inclined clamp.

I have not deemed it necessary herein to show a complete cultivator, as a single bar thereof and the attachment of a single tooth thereto will sufficiently explain my invention.

A is one of the bars of a cultivator. This bar may be of any suitable material and of any suitable shape in cross-section. I prefer, however, a bar of channel or angle iron, and preferably the latter, as I have here shown. Through the horizontal side of this bar is made an opening $a$.

B is the tooth of the cultivator, and $b$ is its shank. This shank passes up through the opening $a$ of the bar, and said opening is sufficiently larger than the shank to permit of a rocking movement of the latter therein in the line of the bar.

C is an eccentric or cam clamp for permitting the adjustment of the tooth and for holding it in the position to which it is adjusted. This clamp consists of a bar or piece which is pivoted to the vertical side of the bar A by means of a bolt or pin D, and a nut $d$ on said bolt or pin serves to tighten and loosen the clamp. The face $c$ of the clamp is made eccentric to its axis, and said clamp has a projecting lip $c'$ on one side, which extends over the outer side of the shank $b$ and serves to press said shank firmly against the vertical side of the bar A.

Now to hold the shank in place it is set to the position at which it is desired the teeth shall operate in the first instance, and then the clamp is brought down into engagement with the shank, so that its lip fits over the outer side thereof and its eccentric face $c$ binds against the forward side of the shank. Then the nut $d$ is set up, whereby the clamp is held in place and the shank is firmly bound against the bar. In this position the tooth cannot move backwardly, because of the bearing of the face of the clamp against the front of the shank. Now when the tooth has become dull and so worn that its under side is beveled to a plane about parallel with the bar it must be readjusted to allow it to sharpen itself. To do this, the nut $d$ is loosened, the clamp is turned upwardly a little, whereby it removes the former bearing-point of its face from the shank, thereby allowing the upper end of the shank to be moved forwardly a little bit, while the tooth is moved backwardly through a slight arc. Then the nut is again tightened and the clamp is held in its fresh position, thus holding the shank and holding the tooth in the position to which it is adjusted. In this position the angle of its under side is different from the previous one, and a fresh surface is thus presented to the ground which wearing down by use sharpens the edge. The use of the cam or eccentric clamp as a means for holding the shanks is advantageous in that the smallest and finest adjustment may be made, as the teeth do not require to be moved, except to an extent just sufficient to sharpen them.

With a single clamp, such as I have described, some provision may have to be made in backing to prevent the tooth from being forced forwardly. To accomplish this, I show in Fig. 2 eccentric or cam clamps, one in front of and one behind the shank, which when set up will bind the shank tightly between them and when properly relieved will permit its adjustment, as heretofore described.

In those cultivators where the bars converge forwardly to the front and the teeth have to be set in line with the travel of the cultivator, and are consequently in a plane at an angle to the bars, the shanks of the teeth will either have to be bent or they must be mounted in the bar at the proper inclination. To effect this latter, which is the preferable form, I show in Fig. 3 the opening $a$ through the bar at an angle and a lug $a'$ on the vertical side of the bar, extending at the same angle as the opening and forming part of its inner wall. The eccentric or cam clamp is pivoted to this lug and lies in the line of the opening and lug. The shank of the tooth being fitted to this inclined hole, the tooth itself will be in proper position, notwithstanding the inclination of the bar. It will be seen that this connection permits the adjustment of the tooth up and down, as well as the movement forward or back. This is useful where the teeth are working in hard ground and should be raised up closer to the bars for the purpose of strength; but when working in loose or sandy or weedy soil they can be lowered.

In the double clamp of Fig. 2 I have shown the clamp provided with flanges $c^2$, having intermeshing teeth. The object of this is to cause the two clamps to move accurately and simultaneously to the same extent in different directions and thus bind the shank when moved to a fresh position. These teeth represent but one form of a connection between two clamps to effect this object.

Having thus described my invention, what I claim as new, and desire to secure by Letters Patent, is—

1. In a cultivator, the combination of the frame-bars, the teeth having shanks fitted adjustably to the bars, whereby said teeth may rock in the line of travel, and the eccentric-faced clamps on the bars bearing on the shanks and having a lip overlapping said shanks, substantially as herein described.

2. In a cultivator, the frame-bar having the opening $a$ and the tooth having the shank passing up through the opening and movable forward and back therein, in combination with the eccentric or cam clamp on the bar bearing on the shank, substantially as herein described.

3. In a cultivator, the frame-bar having the opening $a$, the tooth having the shank fitted in said opening and movable forward and back therein, the clamp on the bar having a cam or eccentric face fitting against the shank, and a lip overlapping its side, substantially as herein described.

4. In a cultivator, the combination of the frame-bar having the inclined opening and inclined lug, the tooth having the shank passing upwardly through said opening and movable therein in a manner to change the pitch of the standard, and the eccentric or cam faced clamp pivoted to the inclined lug and adapted to bear on the shank, substantially as herein described.

In witness whereof I have hereunto set my hand.

JAMES PORTEOUS.

Witnesses:
S. H. NOURSE,
H. F. ASCHECK.